No. 623,446. Patented Apr. 18, 1899.
H. VEDDER.
BAND SAW GUIDE.
(Application filed Nov. 1, 1898.)
(No Model.)
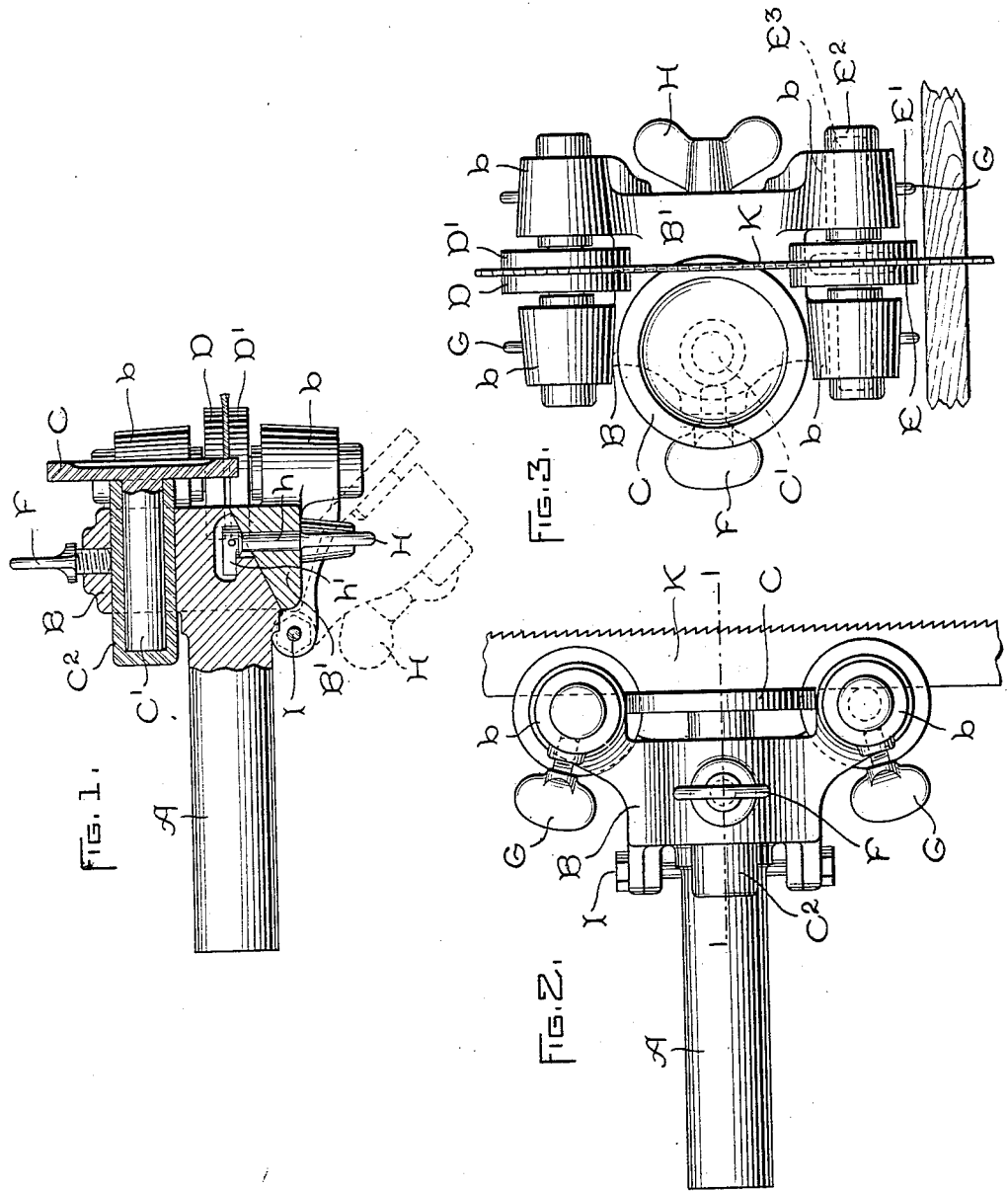
WITNESSES:
A. H. Abell.
B. B. Hill
INVENTOR:
Herman Vedder,
by Thomas J. Johnston,
Atty.
THE NORRIS PETERS CO., PHOTO-LITHO., WASHINGTON, D. C.

UNITED STATES PATENT OFFICE.

HERMAN VEDDER, OF ROTTERDAM, NEW YORK.

BAND-SAW GUIDE.

SPECIFICATION forming part of Letters Patent No. 623,446, dated April 18, 1899.

Application filed November 1, 1898. Serial No. 695,219. (No model.)

*To all whom it may concern:*

Be it known that I, HERMAN VEDDER, a citizen of the United States, residing at Rotterdam, in the county of Schenectady, State of New York, have invented certain new and useful Improvements in Band-Saw Guides, of which the following is a specification.

My invention relates to guides for bandsaws, such as are now in common use in woodworking machinery.

It has for its object to provide a guide which shall be as rigid as it is possible or desirable to make such structures and which shall, while holding the saw firmly, permit it to run freely with the least friction and which shall also bring the guide as close to the work as may be desired. In former constructions of this kind there have been defects which it is aimed to cure in the present invention as far as possible. One form of the old guide has been one or more blocks of lignum-vitæ or other hard wood, in which a groove of substantially the width of the saw has been cut. These have been disposed a few inches apart on the frame, and the back of the saw has been inserted in the groove. While this is efficient when new, the groove wears with great rapidity and in the course of a short time is practically of no assistance in holding the blade true to the work. Another form of guide has held the saw substantially rigid by solid pieces of one form or another on its sides while letting the back of the saw run against the edge of a disk in which a groove has been cut. This has been defective in that a very slight irregularity will throw the back of the saw out of the groove and often entirely off the face of the disk with consequent danger of fracture. Other forms of guide have aimed to employ rollers, the saw running against the periphery of the roller in one way or another; but these have left quite a distance between the work and the point where the saw leaves the guide, and for this reason have been undesirable, as the saw may be twisted and not cut the curves true. Still another guide has employed a disk with its face against the back of the saw; but in this the side supports have been defective and objectionable. While these devices are more or less efficient when the saw is new, they have all their defects exaggerated when it has been mended a few times, and the consequent slight irregularities in the blade tend to cramp the saw in the guide.

In the guide of my invention I provide a disk which supports the back of the saw, the saw running against a part of the face of the disk near its periphery, so that the disk may revolve as the saw passes it. It is so disposed that no variation in the line of the saw is sufficient to permit it to pass off the face of the disk. Above and below the disk I mount pairs of disks, between the faces of which the saw may pass, of course to one side of the center, so that these disks also tend to rotate. Adjusting devices are provided, by which the disks may be brought as close to the sides of the saw as is desired. The disk supporting the back of the saw I prefer to make larger than the others, and the saw is thus supported at three points, upon the back and upon the sides above and below the back support. By changing the upper and lower disks for others of different sizes according to the width of the saw the point at which the latter leaves the guide may be brought as close to the work as may be desired. In practice for saws of all ordinary sizes I select guide-disks of small size and adjust the larger guide-disk supporting the back of the saw so that it is slightly in advance of the centers of the upper and lower guide-disks. This I find to be the best arrangement.

The accompanying drawings show a guide constructed according to my invention.

In the drawings, Figure 1 is a section on the line 1 1 of Fig. 2 looking upward. Fig. 2 is a side elevation looking to the left in Fig. 3. Fig. 3 is a front elevation of the device.

In all of the figures, A is the shank of the guide by which it may be attached to any suitable part of the frame in which the band-saw runs. I have not illustrated any particular frame, inasmuch as the guide may be applied to any of those now in common use.

B B' are the two parts of a suitable carriage, B' being hinged at I to the part B. From each of these parts lugs $b\,b$ project, furnishing a bearing for the upper and lower guide-disks. The two parts are secured together by a thumb-nut H, with the spindle $h$ and the catch $h'$. By turning the nut to the position shown in dotted lines in Fig. 1 the catch $h'$ is turned to register with the slot in the part B, and the two parts carrying the guide-disks may be separated to remove the saw. In the fixed part is mounted the guide-disk C, against the face of which, near its periphery, the saw K runs, the back of the saw bearing against the disk. A sleeve $C^2$ passes through a hole in the carriage B, and a stud C', projecting from the back of the disk C, rotates in the sleeve, in which it makes a working fit. The set-screw F in the carriage B holds the sleeve $C^2$ in place.

The upper and lower guide-disks D D' E E' are mounted in the lugs b b. The disk E' is provided with a sleeve $E^2$ and a stud $E^3$ and is secured in its adjusted position by the set-screw G, the construction being like that of the disk C. Each of the other disks is mounted in the same manner. It will be observed that the disk C is in advance of the centers of the disks D E. In practice the saw is placed on the wheels, (not illustrated,) the guide is brought approximately to the desired position, and the disk C is brought to bear against the back of the saw and locked in position by the set-screw F. The screws G may then be loosened and the disks D E, &c., brought to bear against the sides of the saw as closely as may be desired. The screws G are then turned and the parts are locked in position.

If it be desired to change the saw or for any reason to get access to the parts of the guide, the nut H may be turned and the part B' swung away from the part B, carrying with it the disks D' E'. A new saw may be inserted with or without adjustment of the disks D E, as may be necessary, and the parts of the guide then locked together by turning the wing-nut H.

In practice I have found the device efficient and reliable. It being made of metal throughout and having only rolling friction, it operates the saw true and without binding or cramping, so that it reduces breakage and increases the output of the saw.

What I claim as new, and desire to secure by Letters Patent of the United States, is—

1. In a band-saw guide, the combination of a rotatable disk, the face of which near its periphery supports the back of the saw, with disks having their faces supporting the sides of the saw adjacent to the work, the face of the rear disk being in front of the centers of the side-bearing disks, so that all may freely rotate as the saw travels past them.

2. In a band-saw guide, the combination of a disk having its face bearing near its periphery against the back of the saw, and disks supporting the sides of the saw between their faces near their peripheries, all of the disks being free to rotate; with means for adjusting the disks in the direction of their axes of rotation respectively.

3. In a band-saw guide, the combination of a carriage made in two parts hinged together, a disk for supporting the back of the saw carried in the fixed part of the carriage, upper and lower pairs of disks for supporting the sides of the saw, one of each pair in the fixed part of the carriage, and the other in the moving part, and means for securing the two parts in place.

4. In a band-saw guide, the combination of a carriage in two hinged parts, with a catch for securing the parts in place, a disk C for supporting the back of the saw, having a sleeve-bearing in the fixed part of the carriage with a set-screw bearing against the sleeve, and upper and lower pairs of disks D, E, having longitudinal adjustment and bearing against the sides of the saw, one disk of each pair being in the fixed and one in the hinged part of the carriage.

In witness whereof I have hereunto set my hand this 24th day of October, 1898.

HERMAN VEDDER.

Witnesses:
B. B. HULL,
GENEVIEVE HAYNES.